US007117255B1

(12) United States Patent
Yamamoto et al.

(10) Patent No.: US 7,117,255 B1
(45) Date of Patent: Oct. 3, 2006

(54) SERVER WITH MECHANISM FOR PREVENTING DOUBLE REGISTRATION OF INFORMATION PROVIDED BY CLIENT BROWSER

(75) Inventors: Minoru Yamamoto, Tokyo (JP); Takashi Kaneda, Tokyo (JP); Yuji Iwasaki, Tokyo (JP); Hiroki Ueda, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 565 days.

(21) Appl. No.: 09/714,234

(22) Filed: Nov. 17, 2000

(30) Foreign Application Priority Data

Feb. 7, 2000 (JP) ............................. 2000-028502

(51) Int. Cl.
*G06F 15/16* (2006.01)
(52) U.S. Cl. ..................................... 709/219; 709/225
(58) Field of Classification Search ............... 709/203, 709/218, 228; 715/505, 513; 705/26
See application file for complete search history.

(56) References Cited

U.S. PATENT DOCUMENTS

| 5,774,670 | A | * | 6/1998 | Montulli ..................... 709/227 |
| 5,907,621 | A | * | 5/1999 | Bachman et al. ............ 713/155 |
| 6,044,205 | A | * | 3/2000 | Reed et al. .................. 709/201 |
| 6,061,741 | A | * | 5/2000 | Murphy et al. .............. 709/248 |
| 6,125,352 | A | * | 9/2000 | Franklin et al. .............. 705/26 |
| 6,237,035 | B1 | * | 5/2001 | Himmel et al. .............. 709/224 |
| 6,311,269 | B1 | * | 10/2001 | Luckenbaugh et al. ...... 713/154 |
| 6,336,135 | B1 | * | 1/2002 | Niblett et al. ................ 709/215 |
| 6,385,642 | B1 | * | 5/2002 | Chlan et al. ................. 709/203 |
| 6,393,468 | B1 | | 5/2002 | McGee |
| 6,516,338 | B1 | * | 2/2003 | Landsman et al. .......... 709/203 |
| 2002/0007409 | A1 | * | 1/2002 | Rode ........................... 709/227 |

FOREIGN PATENT DOCUMENTS

| EP | 0 907 132 A1 | 4/1999 |
| JP | 11-167584 | 6/1999 |
| JP | 11-327863 | 11/1999 |
| JP | 2000-112888 | 4/2000 |
| JP | 2000-163343 | 6/2000 |
| WO | WO 98/32066 | 7/1998 |

OTHER PUBLICATIONS

Jia-Wang, "Develop an e-commerce siteusing WebClasses", Visual Basic Programmers Journal, v. 9, No. 10, p. 28-35, Sep. 1999.*
Kang-Woo-Lee et al., "Consistency preserving in transaction processing on the Web", IEEE Intern. Conf. on Web Information Systems Engineering, v. 1, p. 190-195, Jun. 2000.*
Office action issued on Apr. 18, 2006 by the Japanese Patent Office for prior Japanese application No. 2000-028502.

* cited by examiner

*Primary Examiner*—Patrice Winder
(74) *Attorney, Agent, or Firm*—Staas & Halsey LLP

(57) ABSTRACT

A server capable of eliminating the inconvenience which is caused when a request is made after a "back" operation on a client's browser. A request from a client is received, and processed in compliance with the received request. Confirmation information for confirming a display status of the client side is affixed to a result of process, stored, and transmitted. When a request is made again from the client, the confirmation information included in the request is extracted, and it is determined whether the extracted confirmation information extracted coincides with the stored confirmation information. A process performed in compliance with the request is withheld if it is determined that the two sets of confirmation information do not coincide.

4 Claims, 19 Drawing Sheets

SERVER WITH MECHANISM FOR PREVENTING DOUBLE REGISTRATION OF INFORMATION PROVIDED BY CLIENT BROWSER

BACKGROUND OF THE INVENTION (1) Field of the Invention

The present invention relates to a server, and more particularly, to a server for performing a process in compliance with a request from a client.

(2) Description of the Related Art

When exchanging information between a server and a client, a method is employed in which the client stores information (HTML (Hyper Text Markup Language) document etc.) downloaded from the server in a storage device thereof as history and when a "Back" button shown on the browser is operated, the client acquires and displays the information stored in the history, instead of making a request to the server.

This reduces unnecessary accesses to the server, making it possible to ease network congestion and also permitting smooth and speedy operation.

In cases where the Back button is used, however, there is a possibility that a request is sent from a page accessed earlier than the present time. In such cases, the server is unable to recognize the page which the client is then referring to, giving rise to a problem that a status error occurs.

Also, if, after registration for membership is applied for or an order for goods is placed on a member registration or ordering screen, for example, the Back button is operated to return to the same screen and the operation to apply for member registration or to place the order is repeated, a problem of double registration or double ordering arises.

A similar situation is also brought about by the cache function of the client side as well as the cache function of intervening proxy servers etc. that exist from place to place on the Internet.

SUMMARY OF THE INVENTION

An object of the present invention is to provide a server which is capable of reliable operation even in the case where the Back button of client's browser is operated and which also can prevent double registration of information.

To achieve the object, there is provided a server for performing a process in compliance with a request from a client. The server comprises receiving means for receiving a request from a client, processing means for performing a process in compliance with the request received by the receiving means, affixing means for affixing confirmation information for confirming display status of the client side to a result of process performed by the processing means, storing means for storing the confirmation information affixed by the affixing means, transmitting means for transmitting the result of process having the confirmation information affixed thereto by the affixing means to the client which has made the request, extracting means responsive to a request made again from the client, for extracting the confirmation information included in the request, determining means for determining whether or not the confirmation information extracted by the extracting means coincides with the confirmation information stored in the storing means, and withholding means for withholding a process performed by the processing means in compliance with the request if it is judged by the determining means that the two sets of confirmation information do not coincide.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

Figure 1:
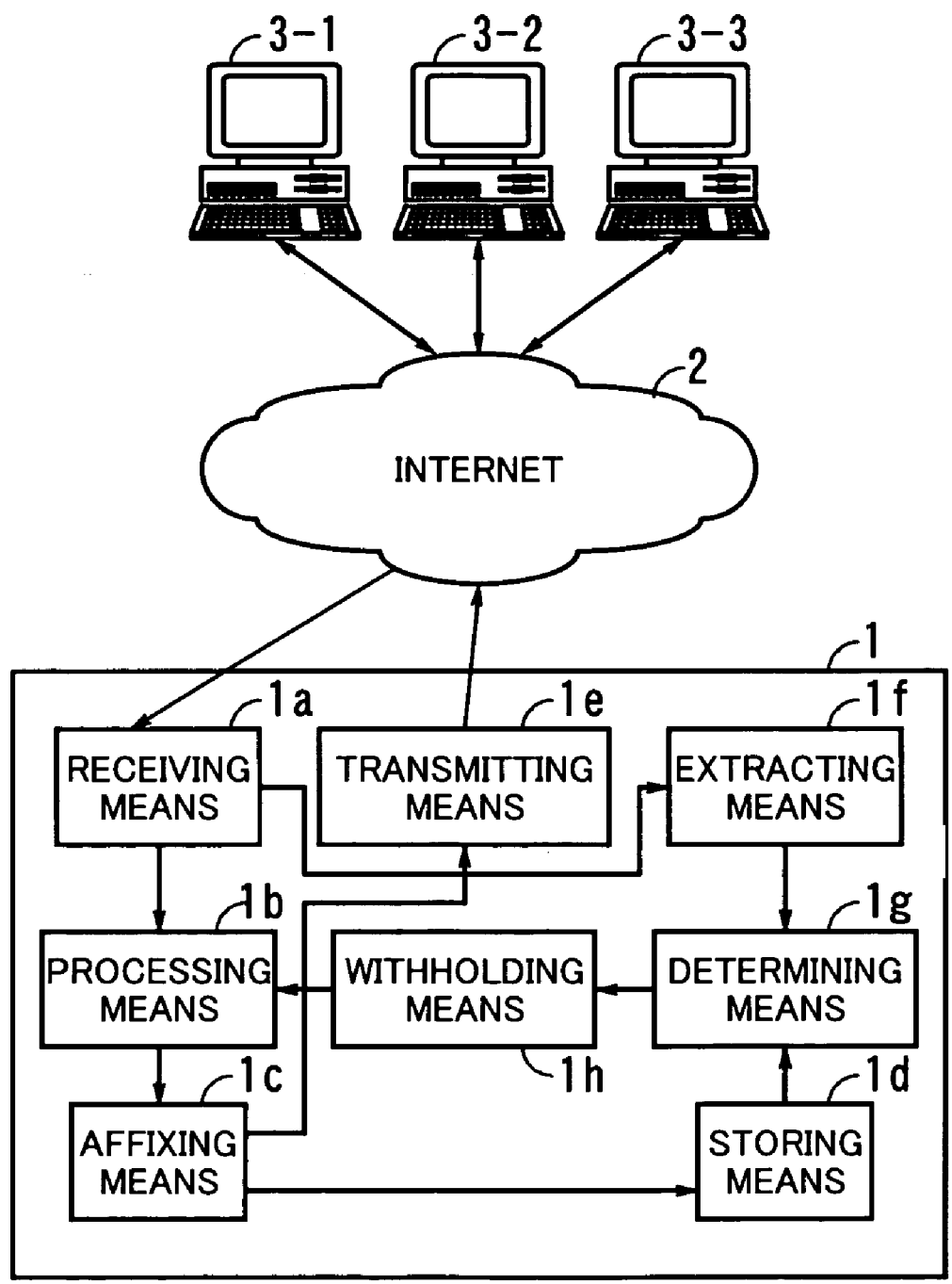
FIG. 1 is a diagram illustrating the principle of operation according to the present invention.

FIG. 1 illustrates the principle of operation according to the present invention. As shown in the figure, a server 1 according to the present invention comprises receiving means 1a, processing means 1b, affixing means 1c, storing means 1d, transmitting means 1e, extracting means 1f, determining means 1g, and withholding means 1h. The server performs a process in compliance with a request from any one of clients 3-1 to 3—3 and returns the obtained result to the client.

The receiving means 1a receives a request from any one of the clients 3-1 to 3—3.

The processing means 1b performs a process in compliance with the request received by the receiving means 1a.

The affixing means 1c affixes confirmation information for confirming display status of the client side to the result of process performed by the processing means 1b.

The storing means 1d stores the confirmation information affixed by the affixing means 1c.

The transmitting means 1e transmits the result of process having the confirmation information affixed thereto by the affixing means 1c to the client which has made the request.

When a request is made again from the client, the extracting means 1f extracts the confirmation information included in the request.

The determining means 1g determines whether or not the confirmation information extracted by the extracting means 1f coincides with the confirmation information stored in the storing means 1d.

If it is judged by the determining means 1g that the two sets of confirmation information do not coincide, the withholding means 1h withholds the processing means 1b from performing a process in compliance with the request.

The clients 3-1 to 3—3 each comprise a personal computer, for example, and exchange information with the server 1 through the Internet 2.

Operation in accordance with the illustrated principle will be now described.

If the client 3-1, for example, logs in to the server 1, the server 1 establishes a session with the client 3-1. At this time, an area for storing the confirmation information for the client 3-1 is reserved in the storing means 1d.

If the client 3-1 thereafter makes a shopping page display request, for example, to the server 1, the request is received by the receiving means 1a and then supplied to the processing means 1b and the extracting means 1f.

In compliance with the request, the processing means 1b acquires an HTML document corresponding to the shopping page from a storage device, not shown, and supplies the acquired document to the affixing means 1c. The affixing means 1c generates the value "1", for example, as the confirmation information for confirming the display status of a browser running on the client 3-1, and affixes the generated value to a predetermined area in the HTML document. Also, the affixing means 1c supplies the generated confirmation information to the storing means 1d to be stored in the area reserved for the client 3-1.

The HTML document thus affixed with the confirmation information is transmitted to the client 3-1 by the transmitting means 1e and displayed on the browser of the client 3-1. As a result, the user of the client 3-1 can make reference to the shopping page.

If, in the shopping page displayed in this manner, an operation to purchase certain goods, for example, is performed, the browser transmits a request for the purchase and the confirmation information (in this example, "1") embedded in the page to the server 1.

In the server 1, the request is received by the receiving means 1a and supplied to the extracting means 1f and the processing means 1b. The extracting means 1f extracts the confirmation information from the received information and supplies the extracted confirmation information to the determining means 1g.

The determining means 1g compares the confirmation information "1" supplied from the extracting means 1f with the confirmation information "1" stored in the storing means 1d, and since the two sets of information coincide, it judges that the operation performed is not illegitimate and thus permits the processing means 1b to perform the requested process. Consequently, the processing means 1b performs a process in compliance with the purchasing request, generates an HTML document indicating normal acceptance of the request for purchasing the goods, and supplies the generated document to the affixing means 1c.

The affixing means 1c generates "2" as new confirmation information, affixes the new confirmation information to the HTML document, and supplies the HTML document affixed with the new confirmation information to the transmitting means 1e. The transmitting means 1e transmits the HTML document to the client 3-1 in reply to the request. At this time, the storing means 1d stores therein the new confirmation information "2" affixed by the affixing means 1c. As a result, a page indicating normal acceptance of the request for purchasing the goods is displayed on the browser of the client 3-1.

If, at this stage, the user of the client 3-1 operates a Back button of the browser, the browser acquires the shopping page, which is the page displayed immediately before the current one, from a storage device, not shown, and displays the acquired page. The page displayed on the browser at this time retains the previously entered data, and accordingly, if, with the page displayed, the user erroneously operates a button for requesting purchase or the Enter key, a purchasing request is again transmitted to the server 1. In this case, the confirmation information inserted in the immediately preceding page, that is, "1", is transmitted together with the request.

The receiving means 1a receives the request from the client 3-1 and supplies the request to the processing means 1b and the extracting means 1f. The extracting means 1f extracts the confirmation information transmitted together with the request, and supplies the confirmation information to the determining means 1g. The determining means 1g acquires the corresponding confirmation information from the storing means 1d and compares the acquired information with the confirmation information supplied from the extracting means 1f. In this example, the confirmation information supplied from the storing means 1d is "2" while the confirmation information extracted by the extracting means 1f is "1"; therefore, the determining means 1g judges that the two sets of confirmation information do not coincide and thus requests withholding of process to the withholding means 1h. The withholding means 1h withholds the requested process performed by the processing means 1b and instead causes the same to generate an HTML document notifying error.

The HTML document notifying error, generated by the processing means 1b, is affixed with new confirmation information "3" by the affixing means 1c and transmitted to the client 3-1 via the transmitting means 1e.

At the client 3-1 side, it can be confirmed by the display content of the browser that an error has occurred due to erroneous operation.

As described above, with the server according to the present invention, in cases where the Back button of client's browser is operated and a certain request is made on the previously displayed screen, such a request is regarded as illegitimate and the requested process is not performed. It is therefore possible to prevent, for example, double membership registration or double ordering.

Figure 2:
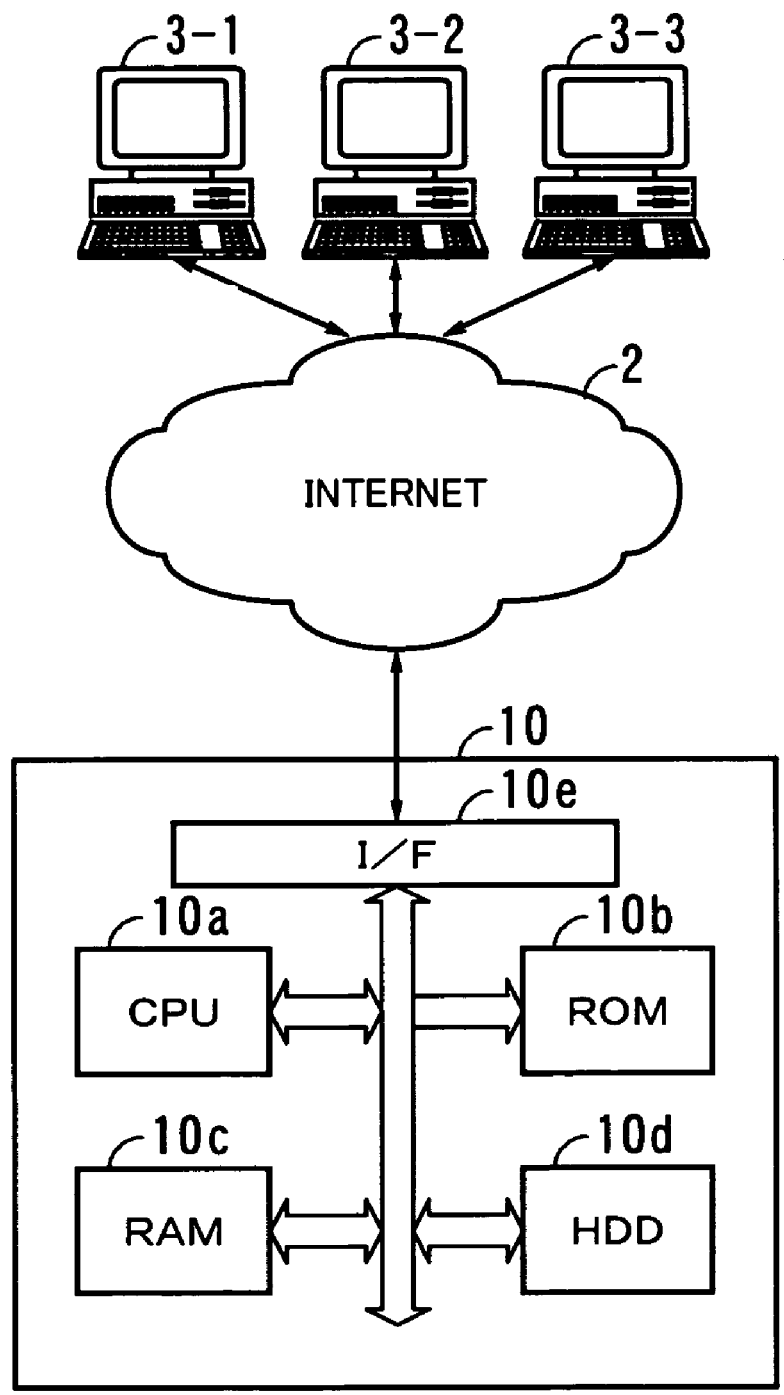
FIG. 2 is a block diagram illustrating a configuration according to an embodiment of the present invention.

Referring now to FIG. 2, a configuration according to an embodiment of the present invention will be described.

FIG. 2 illustrates the configuration according to the embodiment of the invention. As shown in the figure, a server 10 according to the present invention comprises a CPU (Central Processing Unit) 10a, a ROM (Read Only Memory) 10b, a RAM (Random Access Memory) 10c, an HDD (Hard Disk Drive) 10d, and an I/F (Interface) 10e.

The CPU 10a controls the individual parts of the server and also performs various processes in accordance with programs and data stored in the HDD 10d.

The ROM 10b stores basic programs executed by the CPU 10a as well as data.

The RAM 10c temporarily stores programs being executed by the CPU 10a and data derived in the middle of operations.

The HDD 10d stores programs to be executed by the CPU 10a as well as data.

The I/F 10e performs protocol conversion conformable to the Internet 2, thereby to permit exchange of data with the clients 3-1 to 3—3.

The Internet 2, which is a conglomeration of servers scattered all over the world, allows information to be transmitted between the server 10 and the clients 3-1 to 3—3.

Each of the clients 3-1 to 3—3, which comprises a personal computer, for example, makes a request to the server 10 through the Internet 2 and displays obtained data on a browser which is an application program.

Referring now to the sequence diagram of FIG. 3 and exemplary screens shown in FIGS. 4 through 8, operation of the above embodiment will be described.

Figure 3:
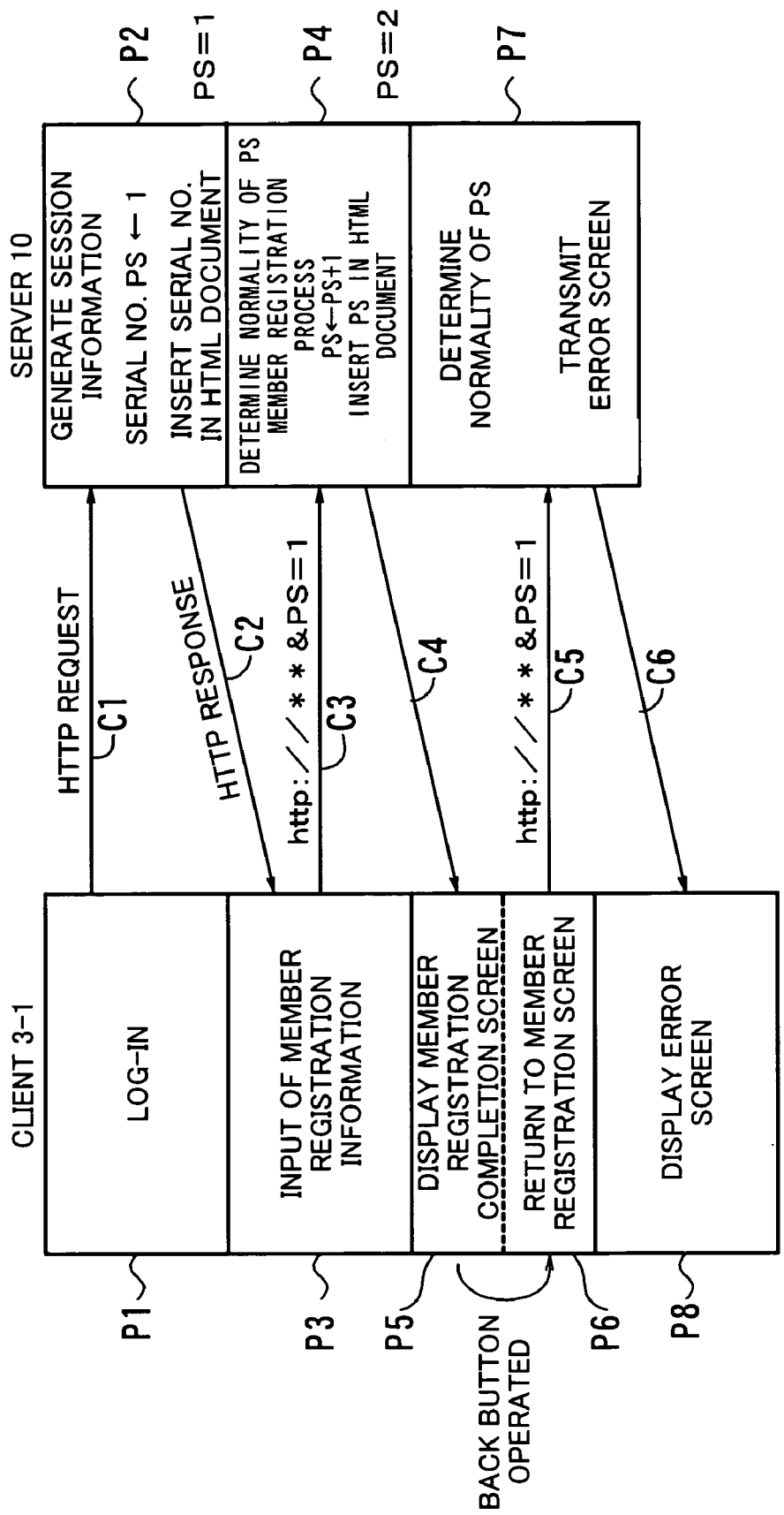
FIG. 3 is a sequence diagram showing progress of a process of communication between a client and a server according to a first embodiment of the present invention.

As shown in FIG. 3 by way of example, if the client 3-1 makes a member registration request (HTTP (Hyper Text Transfer Protocol) request) C1 with respect to a predetermined homepage possessed by the server 10 in P1, the server 10 establishes a session, reserves a storage area for this client in the HDD 10d or the RAM 10c, and acquires a corresponding HTML document from the HDD 10d, in P2.

Subsequently, the server 10 initializes a serial number PS for confirming the display status of the client side to "1", inserts the serial number in a hidden field (field which is not displayed on the browser) of the HTML document, and also stores the serial number in the area of the HDD 10d reserved for the client. The HTML document embedded with the serial number is then transmitted to the client 3-1 as an HTTP response C2.

Figure 4:
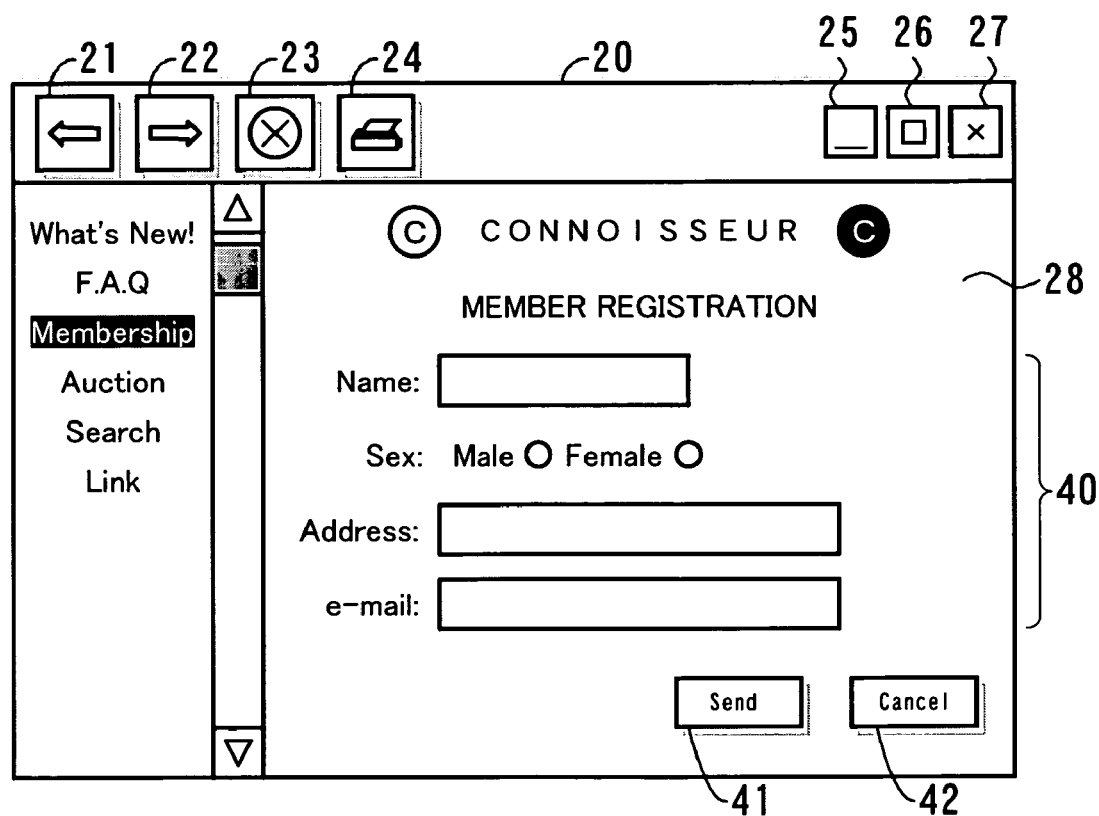
FIG. 4 shows an example of a screen displayed first upon logging in to a member registration screen.

As a result, an information input screen for member registration is displayed on the browser of the client 3-1 in P3. FIG. 4 shows an example of a screen displayed on the browser at this time. In the illustrated example, a Back button 21, a Forward button 22, a Stop button 23, a Print button 24, a Minimize button 25, a Maximize button 26 and a Close button 27 are shown at the top of a window 20.

The Back button 21 is operated to return to a previously displayed page, and in cases where the Back button 21 has thus been operated, the Forward button 22 may be operated to display the following page. The Stop button 23 is operated to stop the reception of a page, and the Print button 24 is operated to print out the display content. The Minimize button 25, the Maximize button 26 and the Close button 27 are operated to minimize, maximize, and close the window 20, respectively.

In a display area 28 is shown an input screen for member registration. In the illustrated example, display items for entering the name, sex, address and e-mail address of a member-to-be are shown in a region 40. A Send button 41, which is operated to transmit the entered data to the server 10, and a Cancel button 42, which is operated to cancel the entered data, are shown at the bottom of the display area 28.

Figure 5:
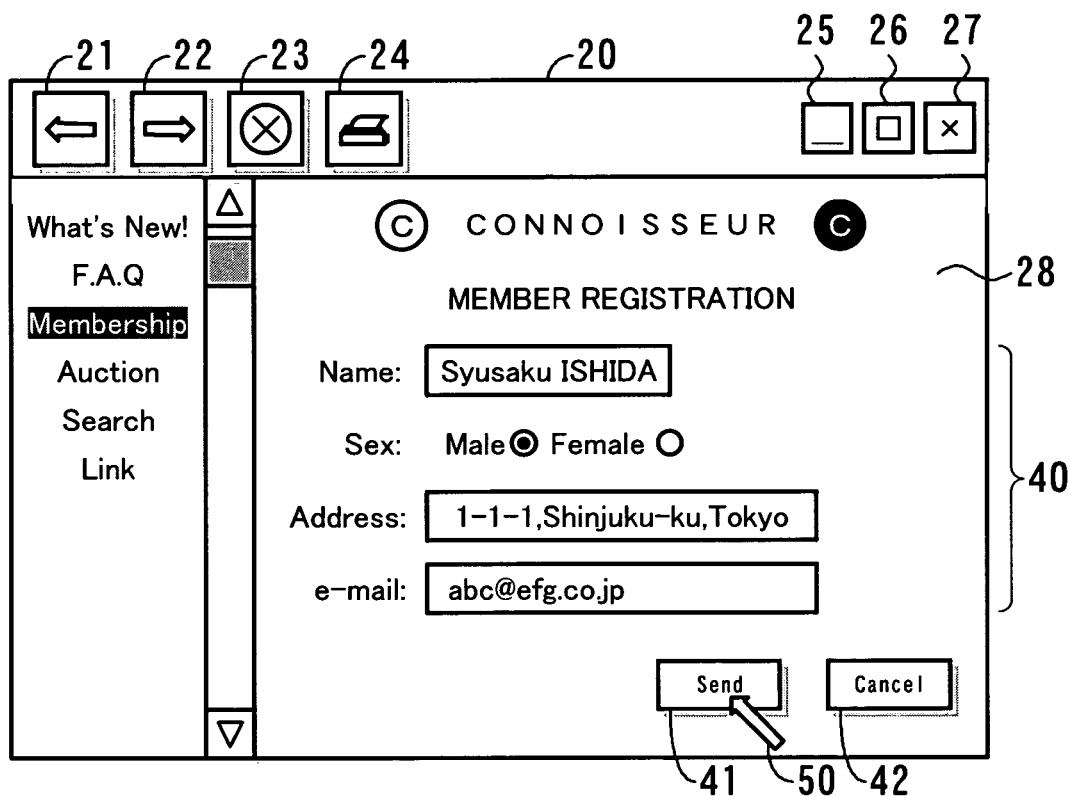
FIG. 5 shows an example of data entry in predetermined items in the screen of FIG. 4.

If, with information as shown in FIG. 5, for example, input on the screen, the Send button 41 is operated with a pointer 50, the serial number embedded in the page is transmitted, along with the input information, to the server 10 (C3).

In P4, the server 10 receives the member information transmitted from the client 3-1, then extracts the serial number and compares the extracted number with the serial number stored in the reserved area of the HDD 10d. If, as a result of the comparison, the two serial numbers are found to be the same, a member registration process is performed. Then, the value of the serial number PS is incremented by "1" and the resulting value is stored in the area of the HDD 10d reserved for the client 3-1.

Subsequently, the CPU 10a of the server 10 retrieves an HTML document indicating normal registration from the HDD 10d and transmits the retrieved document, with the serial number PS inserted in the hidden field thereof, to the client 3-1 (C4).

Figure 6:
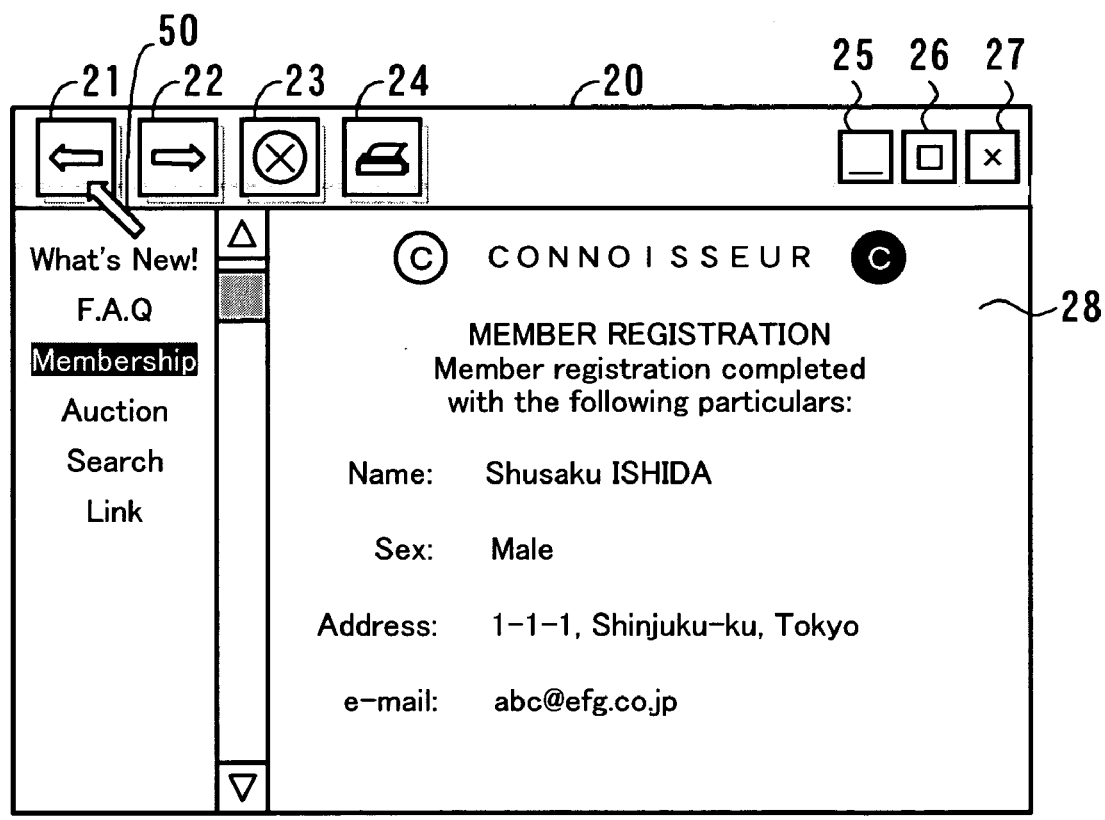
FIG. 6 shows an example of a screen displayed after a Send button is operated in a registration screen shown in FIG. 5.

As a result, a screen as shown in FIG. 6 is displayed on the browser of the client 3-1, in P5. In the illustrated example, the information entered in the input screen of FIG. 5 is displayed.

If, with the screen displayed in this manner, the user operates the Back button 21, the client 3-1 reads out the HTML document stored as history in the storage device, not shown, and displays the document in the display area 28 of the browser (P6).

Figure 7:
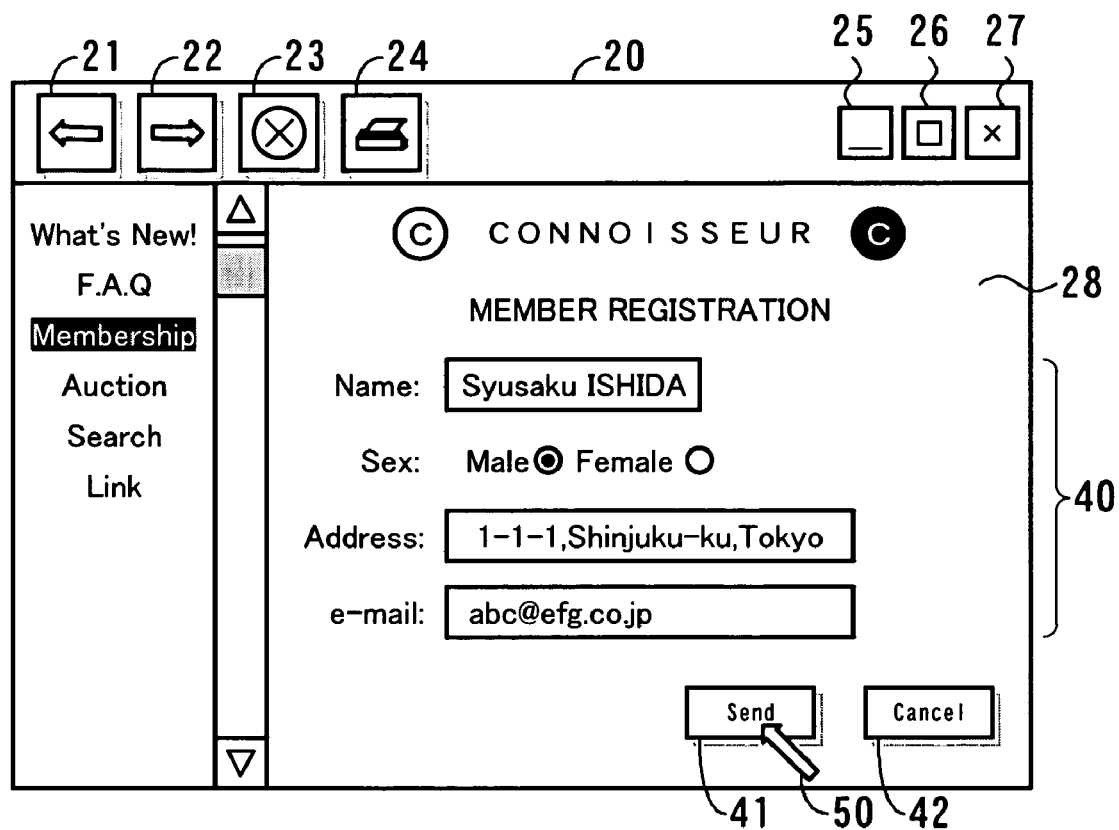
FIG. 7 shows an example of a screen displayed when a Back button has been operated in the screen shown in FIG. 6.

FIG. 7 illustrates a screen displayed when the Back button 21 has been operated in the screen shown in FIG. 6. The screen shown in this example is identical with that of FIG. 5.

If the Send button 41 is operated on this screen, the client 3-1 again makes a member registration request to the server 10. In this case, the serial number stored in the hidden field of this page is affixed to the request, and accordingly, PS=1.

On receiving the information, the server 10 compares the serial number included in the received information with the serial number stored in the HDD 10d, in P7, to determine the normality of the received serial number. In this example, the serial number included in the received information is "1" while the serial number stored in the HDD 10d is "2", and it is therefore concluded that the two numbers do not coincide. Accordingly, the CPU 10a acquires an HTML document indicating occurrence of error from the HDD 10d and transmits the document to the client 3-1. Also in this case, the serial number (in this example, "3") is inserted in the hidden field and is stored in the area of the HDD 10d reserved for the client 3-1.

The client 3-1 receives the HTML document transmitted from the server 10 and displays the document on the browser. As a result, a screen shown in FIG. 8, for example, is displayed. In the illustrated example, the screen shows a message notifying occurrence of error and a Return button 53 which is operated for a return process.

Thus, in cases where a certain request is made on a previous page which is displayed by the operation of the Back button 21, the server 10 does not perform a process in compliance with the request but makes notification of error, whereby double membership registration, double ordering, etc., for example, can be prevented.

Figure 8:
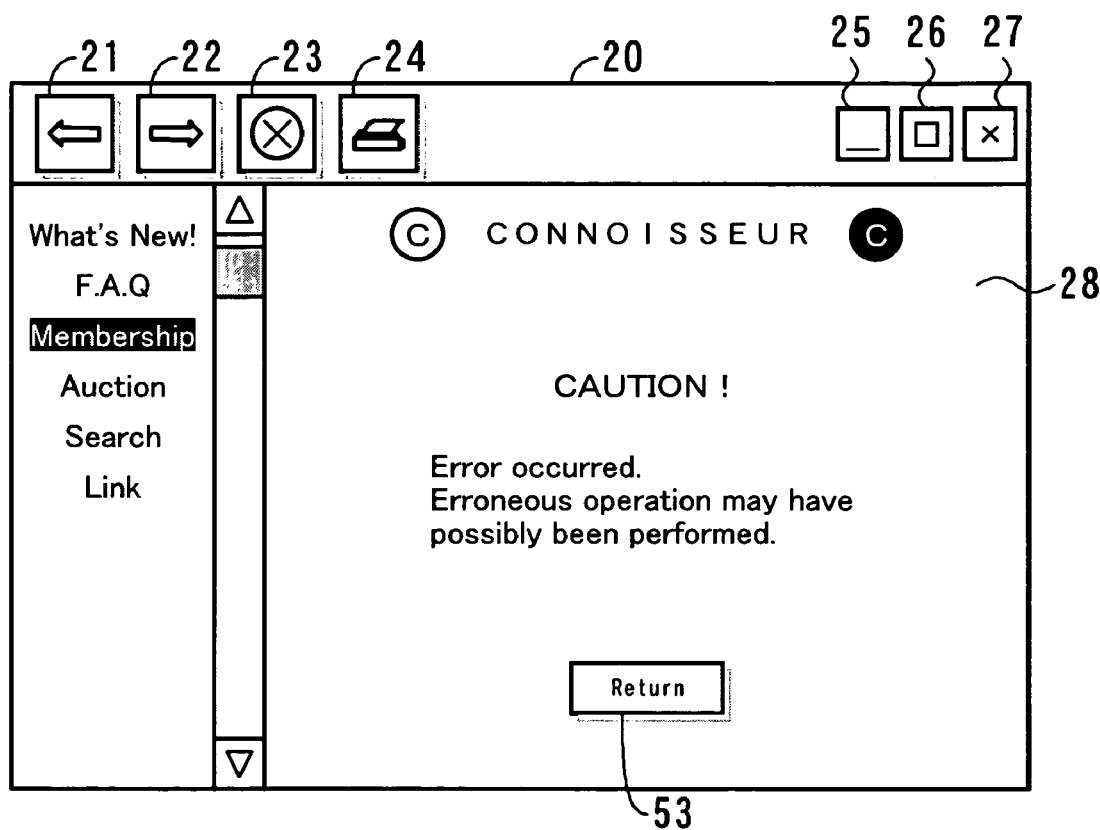
FIG. 8 is a diagram showing an example of a screen displayed when the Send button has been operated in the screen shown in FIG. 7.

When the Return button 53 is operated in the display screen shown in FIG. 8, a request to return to, for example, an index page (page within the homepage that is displayed first) and the serial number "3" stored in the hidden field of this page are transmitted to the server 10.

On concluding that the serial number included in the received information coincides with the serial number stored in the HDD 10d, the server 10 accepts the request and transmits an HTML document corresponding to the index page to the client 3-1.

As a result, the index page is displayed on the browser of the client 3-1.

According to the embodiment described above, double registration of information in the server as well as double acceptance of the same request can be prevented.

In the above embodiment, the serial number PS is stored in the HDD 10d, but the RAM 10c, instead of the HDD 10d, may be used for the purpose.

A flowchart for carrying out the aforementioned process will be now described.

Figure 9:
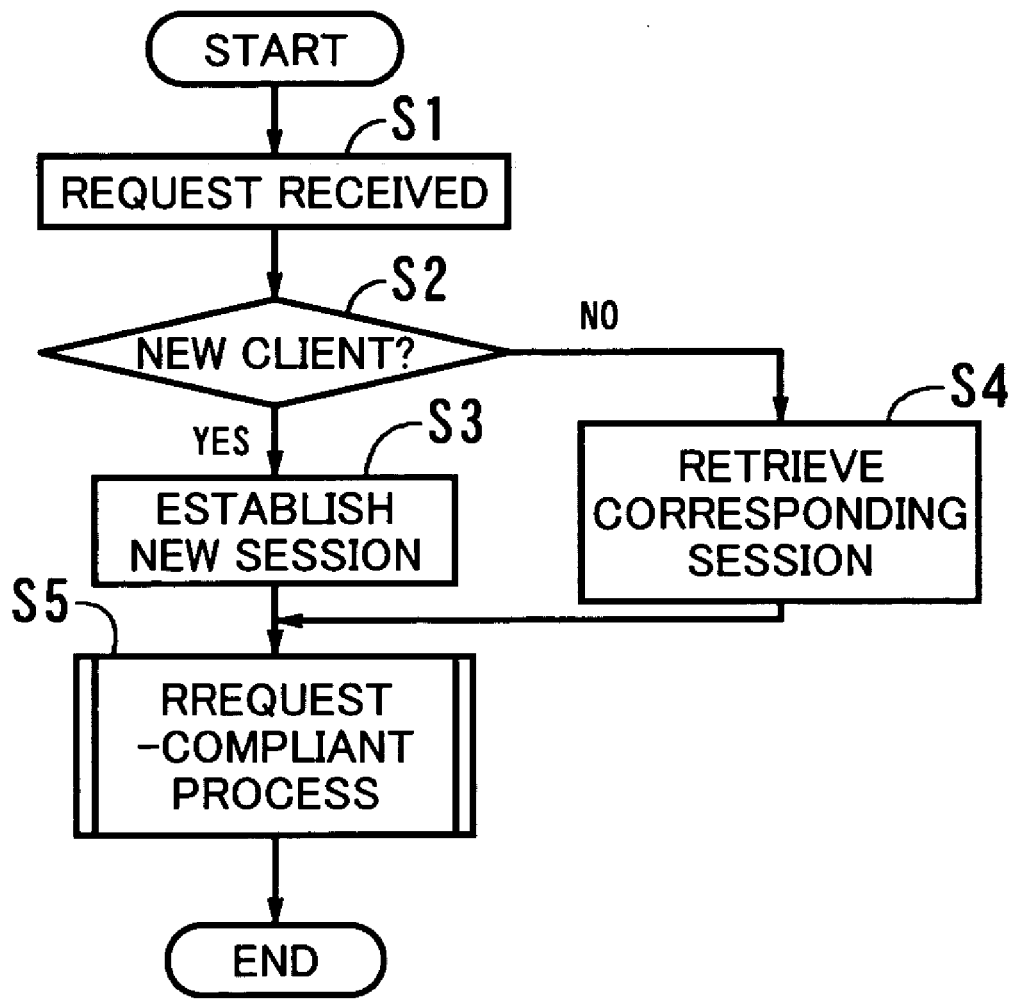
FIG. 9 is a flowchart showing an example of a process for establishing a session in response to a request from a client.

Referring first to FIG. 9, an example of a process for establishing a session in response to a request from a client will be described. In this embodiment, the server 10 establishes a session with each client, exchanges information and manages the status of communication in terms of session. Upon start of the process shown in the flowchart, the following steps are executed.

[S1] The CPU 10a receives a request from a client.

[S2] The CPU 10a determines whether or not the client is a new client which has just logged in. If the client is a new client, the flow proceeds to Step S3; if not, the flow proceeds to Step S4.

[S3] The CPU 10a establishes a new session with the new client.

[S4] The CPU 10a retrieves the corresponding session from the HDD 10d.

[S5] The CPU 10a performs a process in compliance with the request from the client.

Figure 10:
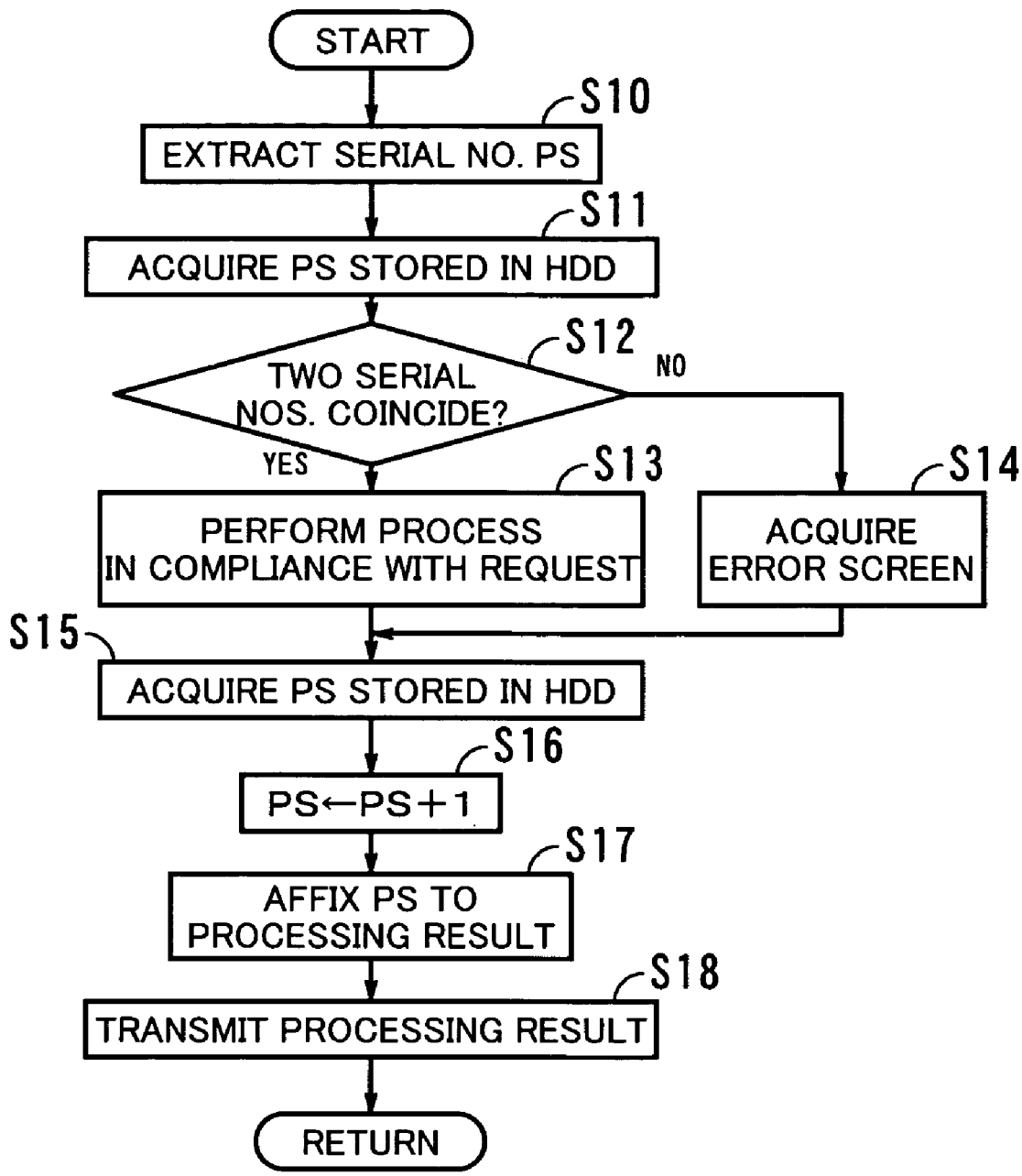
FIG. 10 is a flowchart illustrating details of a "Request-compliant Process" appearing in FIG. 9.

Referring now to FIG. 10, details of the "Request-compliant Process" appearing in FIG. 9 will be described. Upon start of the process shown in the flowchart, the following steps are executed.

[S10] The CPU 10a extracts the serial number PS from the received information.

[S11] The CPU 10a acquires, from the predetermined area of the HDD 10d, the serial number PS corresponding to the client which has made the request.

[S12] The CPU 10a determines whether the serial numbers acquired respectively in Steps S10 and S11 coincide or not. If the two serial numbers coincide, the flow proceeds to Step S13; if not, the flow proceeds to Step S14.

[S13] The CPU 10a performs a process in compliance with the request.

[S14] The CPU 10a generates an HTML document including a message notifying occurrence of error.

[S15] The CPU 10a again acquires the serial number PS stored in the HDD 10d.

[S16] The CPU 10a increments the value of the serial number PS by "1" and stores the resulting value in the HDD 10d.

[S17] The CPU 10a affixes the serial number PS to a hidden filed in the HTML document obtained as a result of the process.

In the case where an error has occurred (if the decision in Step S12 is NO), the serial number PS is inserted in the hidden field of the HTML document indicating occurrence of error.

[S18] The CPU 10a transmits the HTML document affixed with the serial number to the client which has made the request.

The process described above makes it possible to prevent double registration of information or the like without fail.

In the above embodiment, when an error has occurred, an HTML document indicating the occurrence of error is generated and transmitted. Alternatively, in such a situation, a process for returning to a predetermined page (e.g., index page) or log-out may be performed.

A second embodiment of the present invention will be now described.

In the first embodiment, a request made on a screen which is displayed by the operation of the Back button 21 is rejected, but in some cases such a request should preferably be accepted. This applies, for example, to the case of returning to a previously displayed page within a search results screen. In the second embodiment of the present invention, therefore, a liberal zone is set such that the operation of the Back button 21 is allowed within the zone.

Figure 11:
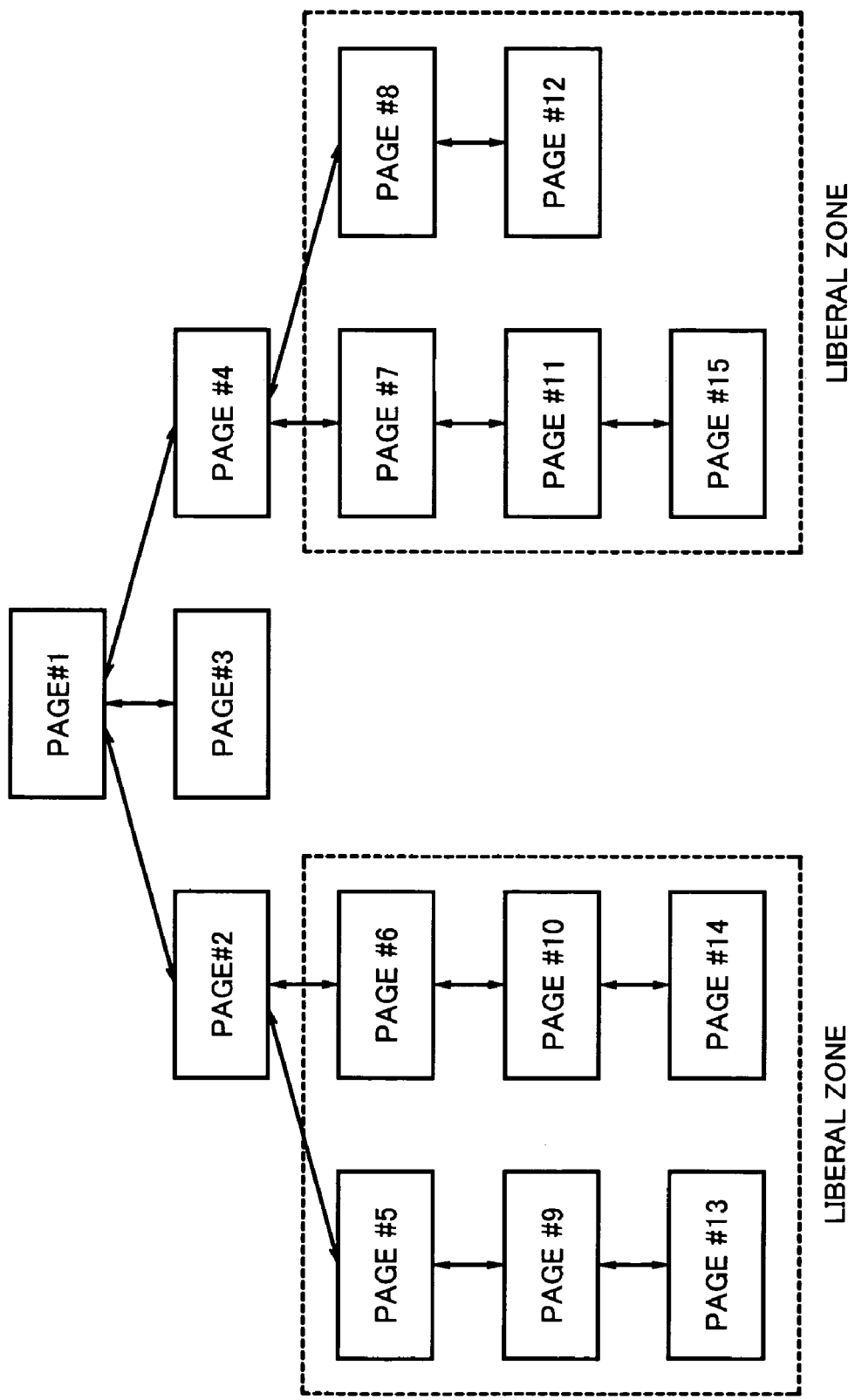
FIG. 11 is a diagram illustrating a liberal zone.

This will be outlined with reference to FIG. 11. In the illustrated example, pages #5, #6, #9, #10, #13 and #14 constitute one liberal zone, and the use of the Back button 21 is allowed within the zone. Also, pages #7, #8, #11, #12 and #15 similarly constitute a liberal zone. Pages #1 through #4 do not belong to either of the liberal zones, and the use of the Back button 21 is limited in these pages.

Referring now to the sequence diagram of FIG. 12 and exemplary screens shown in FIGS. 13 through 18, operation of the second embodiment will be described.

Figure 12:
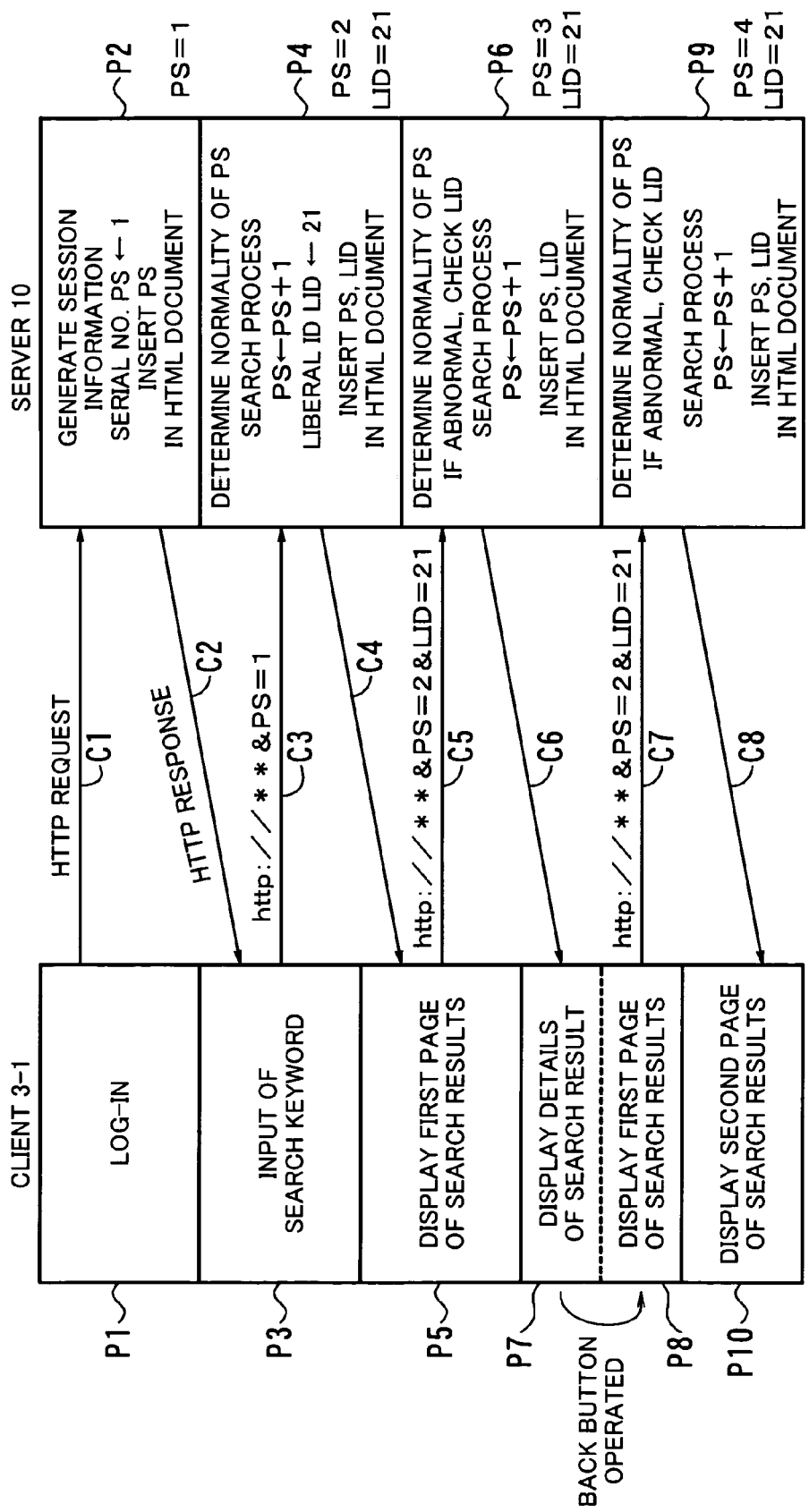
FIG. 12 is a sequence diagram showing progress of a process of communication between a client and a server according to a second embodiment of the present invention.

If, as shown in FIG. 12, the client 3-1 makes a request (HTTP (Hyper Text Transfer Protocol) request) C1 to log in to a search homepage possessed by the server 10 in P1, the server 10 establishes a session, reserves a storage area for this client in the HDD 10d or the RAM 10c, and acquires a corresponding HTML document from the HDD 10d, in P2.

Subsequently, the server 10 initializes the serial number PS for confirming the display status of the client side to "1", inserts the serial number in a hidden field of the HTML document, and also stores the serial number in the area of the HDD 10d reserved for the client. The HTML document embedded with the serial number is then transmitted to the client 3-1 as an HTTP response C2.

Figure 13:
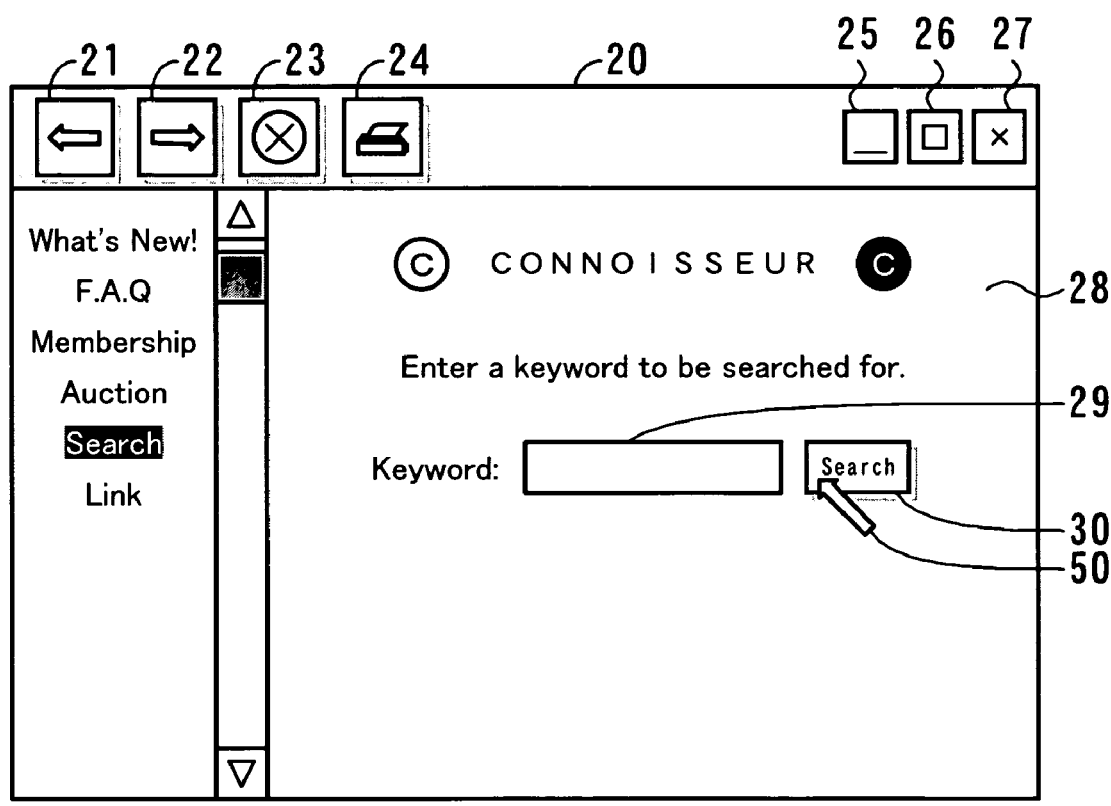
FIG. 13 is a diagram showing an example of a search screen.

As a result, a search screen is displayed on the browser of the client 3-1 in P3. FIG. 13 shows an example of a screen displayed on the browser at this time. In the illustrated example, a textbox 29 for entering a keyword and a Search button 30 are shown in the display area 28.

Figure 14:
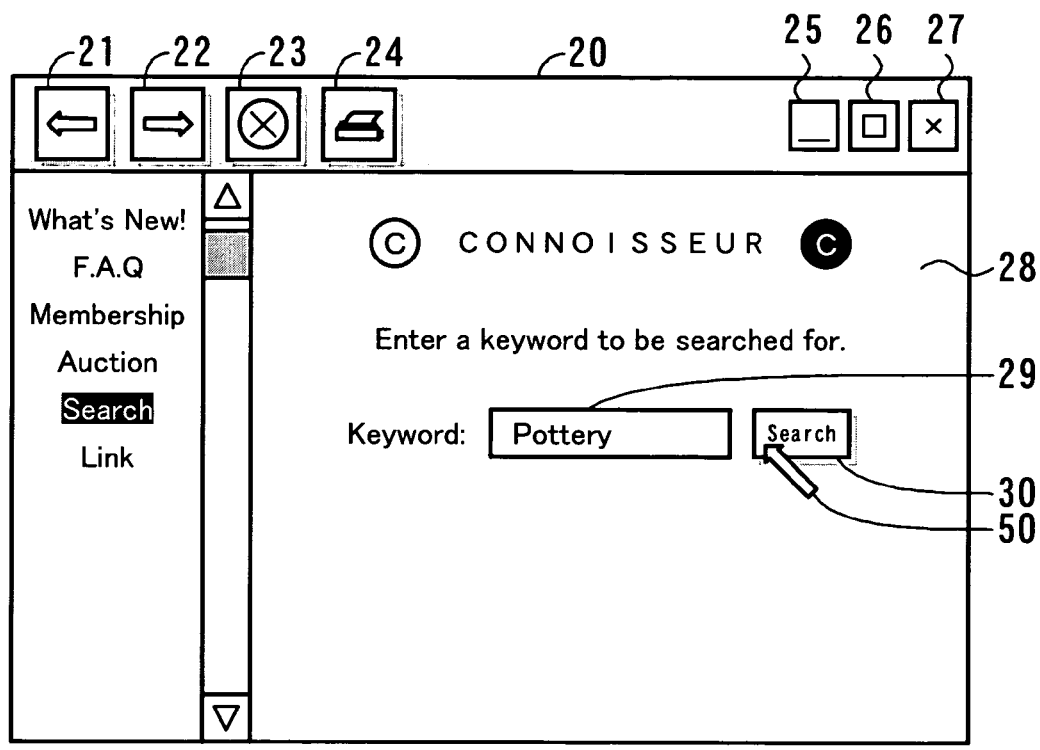
FIG. 14 is a diagram showing entry of a keyword in the screen of FIG. 13.

If, with a keyword "Pottery", for example, entered in the screen as shown in FIG. 14, the Search button 30 is operated, a search request including the keyword and the serial number embedded in this page are transmitted to the server 10 (C3).

On receiving the request, the server 10 extracts the serial number and compares the extracted number with the serial number stored in the HDD 10d, to determine whether or not the two are the same. If, as a result of the comparison, the two numbers are found to be the same, the server judges that the request made is normal and thus performs a search process in compliance with the request.

If data obtained as a result of the search process extends over multiple pages, the CPU 10a defines the multiple pages as a liberal zone in which the movement with the use of the Back button 21 is allowed, and generates a liberal ID LID for identifying the liberal zone. In this example, "21" is generated as the liberal ID. The CPU 10a also increments the value of the serial number PS by "1", thereby setting the serial number to "2".

The serial number and the liberal ID generated in this manner are embedded in a hidden field of the first page of search results, and the first page is then transmitted to the client 3-1 which has made the request (C4).

Figure 15:
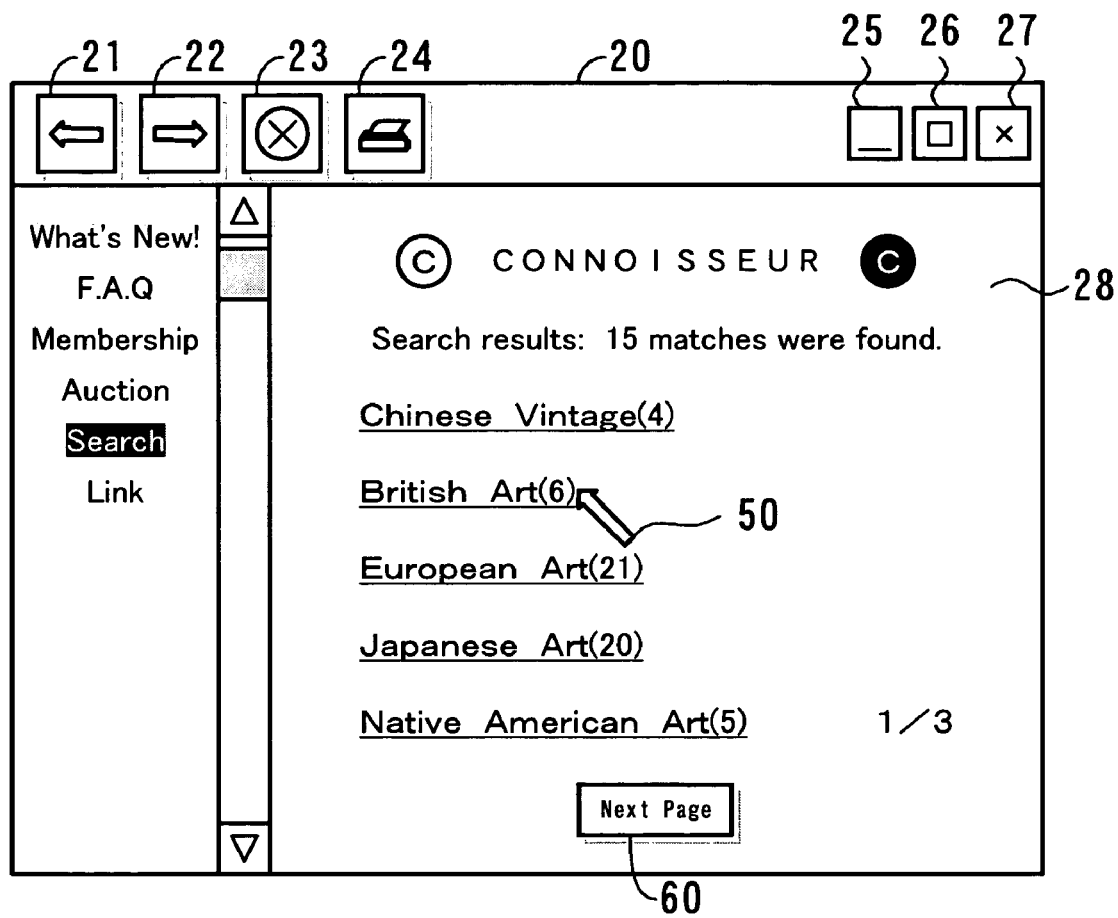
FIG. 15 shows an example of a screen displayed after a Search button is operated in the screen shown in FIG. 14.

As a result, a search results screen as shown in FIG. 15 is displayed on the browser of the client 3-1. In the illustrated example, a page showing the first five items out of a total of 15 search results is displayed.

If, with the search results displayed on screen, the second display item "British Art (6)", for example, is selected with the pointer 50, a request for detailed information on this item is transmitted to the server 10. The request transmitted at this time is affixed with the serial number "2" and the liberal ID "21".

On receiving the request, the server 10 first checks the serial number to see if it is normal, and if the serial number is not normal, the liberal ID is checked. In this example, the serial number "2" affixed to the request coincides with the one stored in the HDD 10*d* and thus is normal; therefore, it is concluded that the request is normal, without making a liberal ID check, and the requested HTML document is retrieved from the HDD 10*d*.

The CPU 10*a* increments the value of the serial number by "1", inserts the resulting serial number, together with the liberal ID, in the hidden field of the HTML document acquired from the HDD 10*d*, and transmits the document to the client 3-1 (C6).

Figure 16:
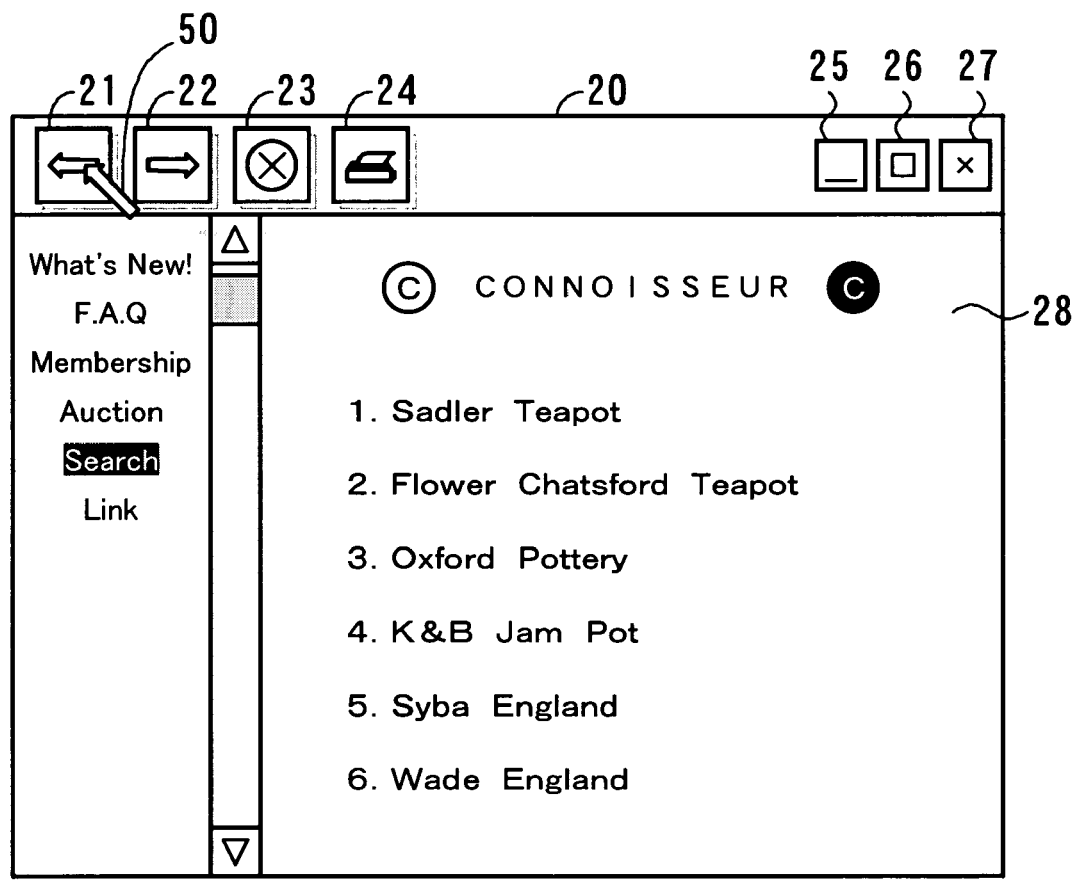
FIG. 16 shows an example of a screen displayed when a display item "British Art (6)" has been selected in the screen shown in FIG. 15.

As a result, details of the item "British Art (6)" specified in the screen of FIG. 15 are displayed on the browser of the client 3-1, as shown in FIG. 16. In the illustrated example, six items in total are displayed.

If, with this screen displayed, the Back button 21 is operated, the client 3-1 acquires the HTML document corresponding to the search screen from the storage device, not shown, and displays the document on the browser. As a result, a screen shown in FIG. 17 (which is identical with the screen of FIG. 15) is displayed.

Figure 17:
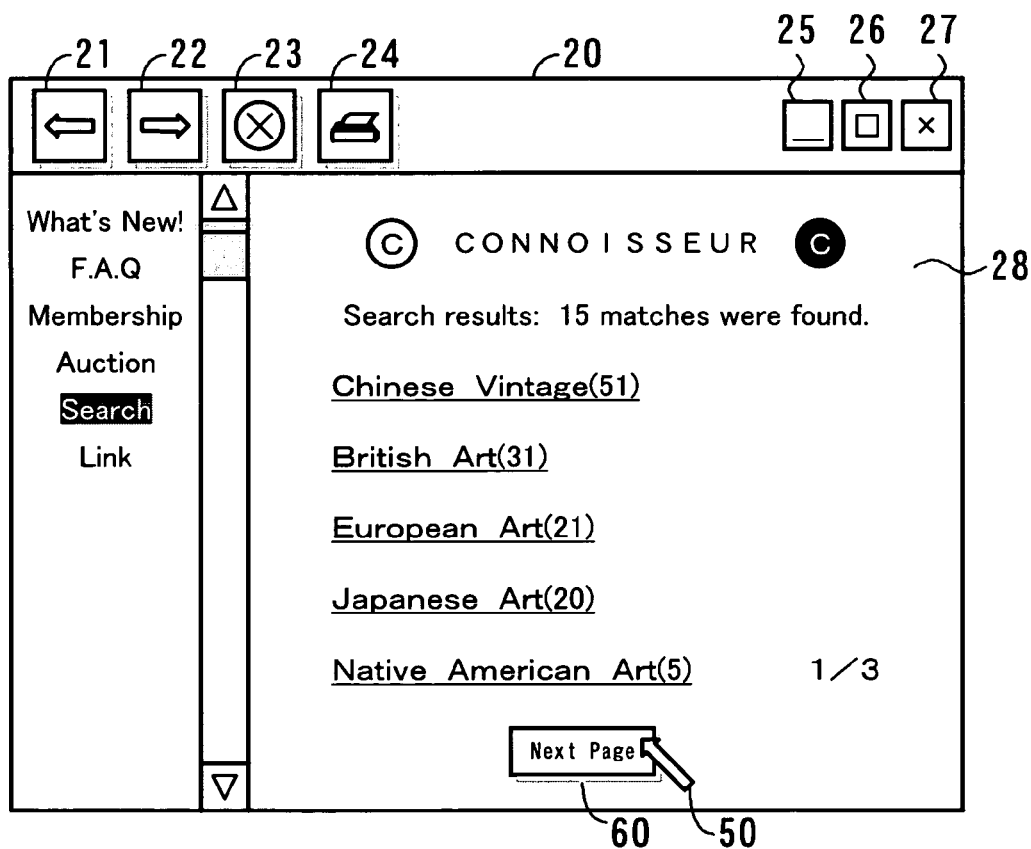
FIG. 17 shows an example of a screen displayed when the Back button has been operated in the screen shown in FIG. 16.

If, in the display screen shown in FIG. 17, a Next Page button 60 is operated to make reference to the next page, the client 3-1 transmits a next page display request to the server 10. The request transmitted at this time is affixed with the serial number "2" and the liberal ID inserted in this page.

On receiving the request, the server 10 first determines whether or not the serial number is normal. In this example, the serial number stored in the HDD 10*d* is "3" while the serial number extracted from the received request is "2" and the two do not coincide; therefore, it judged that the received serial number is abnormal. When the serial number is judged abnormal, the CPU 10*a* extracts the liberal ID from the request and compares the extracted ID with the liberal ID stored in the HDD 10*d*. If these liberal IDs are the same, it is judged that the request has been made within the liberal zone and the requested process is performed. In this example, the liberal ID stored in the HDD 10*d* is "21" and the same liberal ID is affixed to the request; therefore, it is concluded that the request made is normal and the next page search is conducted.

After acquiring the next page, the CPU 10*a* inserts the value obtained by incrementing the serial number by "1" and the liberal ID in a hidden field thereof, and transmits the page to the client 3-1.

Figure 18:
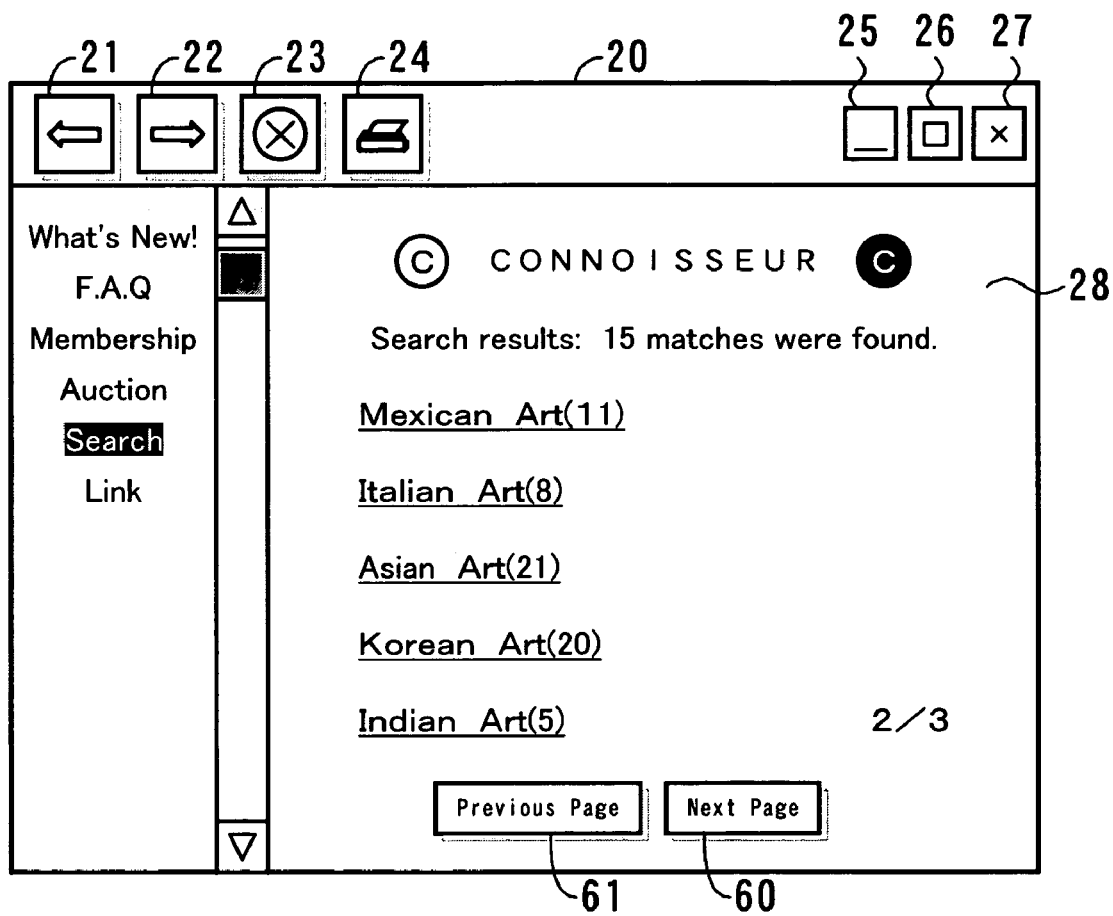
FIG. 18 shows an example of a screen displayed when a Next Page button has been operated in the screen shown in FIG. 17.

As a result, a screen as shown in FIG. 18 is displayed on the browser of the client 3-1. In the illustrated example, the sixth to tenth items, among the 15 items matching the keyword entered in the screen of FIG. 14, are displayed.

If, after the Back button 21 is operated, a predetermined request is made outside the liberal zone, then no liberal ID exists, and accordingly, an error screen identical with that shown in FIG. 8 is displayed.

In the above embodiment, a liberal zone is set and the operation of the Back button 21 is allowed within the liberal zone. Accordingly, in cases where search results are displayed, for example, it is possible to make reference to information while freely moving within the liberal zone.

Figure 19:
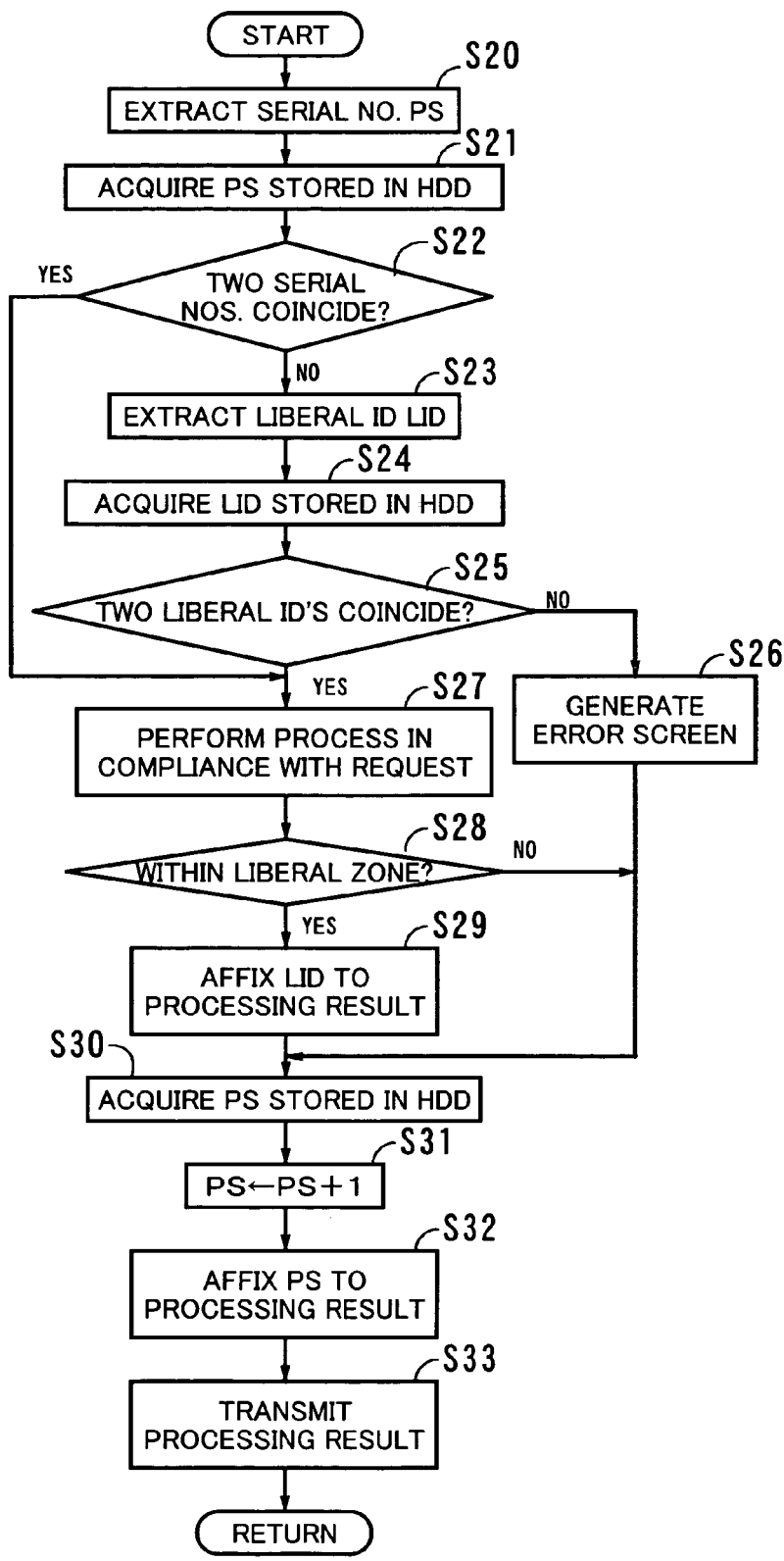
FIG. 19 is a flowchart showing an example of a process executed in the second embodiment of the present invention.

A process for achieving the operation of the aforementioned embodiment will be now described. FIG. 19 is a flowchart illustrating the operation according to the second embodiment of the present invention. Upon start of the process shown in the flowchart, the following steps are executed.

[S20] The CPU 10*a* extracts the serial number PS from the received request.

[S21] The CPU 10*a* acquires the serial number PS from the area of the HDD 10*d* reserved for the client which has made the request.

[S22] The CPU 10*a* determines whether or not the serial numbers acquired in Steps S20 and S21 coincide. If the two coincide, the flow proceeds to Step S27; if not, the flow proceeds to Step S23.

[S23] The CPU 10*a* extracts the liberal ID LID from the received request.

[S24] The CPU 10*a* acquires the liberal ID LID from the area of the HDD 10*d* reserved for the client which has made the request.

[S25] The CPU 10*a* determines whether or not the liberal IDs acquired in Steps S23 and S24 coincide. If the two coincide, the flow proceeds to Step S27; if not, the flow proceeds to Step S26.

[S26] The CPU 10*a* generates an HTML document including a message notifying occurrence of error.

[S27] The CPU 10*a* performs a process in compliance with the request.

[S28] The CPU 10*a* determines whether or not the current process is within the liberal zone. If the current process is within the liberal zone, the flow proceeds to Step S29; if not, the flow proceeds to Step S30.

To determine whether or not the current process is within the liberal zone, a table showing the correlation between each HTML document and the liberal zone may be created beforehand and may be looked up to make the determination.

[S29] The CPU 10*a* affixes the liberal ID LID to a hidden fieled of the HTML document obtained as a result of processing.

[S30] The CPU 10*a* acquires the serial number PS from the area of the HDD 10*d* reserved for the client which has made the request.

[S31] The CPU 10*a* increments the value of the serial number by "1" and stores the resulting value in the HDD 10*d*.

[S32] The CPU 10*a* affixes the serial number PS to the hidden field of the HTML document obtained as a result of processing.

In the case where an error has occurred (if the decision in Step S25 is NO), the serial number PS is affixed to the HTML document including a message notifying the occurrence of error.

[S33] The CPU 10*a* transmits the HTML document obtained as a result of processing to the client which has made the request.

According to the above process, the functions explained with reference to the second embodiment of the present invention can be performed.

In the foregoing embodiments, the value which is successively incremented by "1" at a time is used as the serial number, but other information may of course be used. The intended purpose can be achieved if distinction can be made between the information stored in the server and the information transmitted from clients.

Although in the above embodiments, explanation is made of the case of using the cache function of the client side, similar advantageous effects can be obtained also in the case of using the cache function of proxy servers etc. that exist from place to place on the network.

The above-described processes can be performed by a computer. In this case, the functions to be accomplished by the server are described in a program recorded in a computer-readable recording medium. By executing the program by a computer, it is possible to perform the above-described processes. The computer-readable recording medium includes magnetic recording device, semiconductor memory and the like. To distribute the program to the market, the program may be stored in portable recording media such as CD-ROM (Compact Disk Read Only Memory) or floppy disk. Alternatively, the program may be stored in a storage device of a computer connected to a network and may be transferred to other computers through the network. To execute the program by a computer, the program stored in a hard disk unit or the like of the computer is loaded into the main memory and executed.

As described above, according to the present invention, a server for performing a process in compliance with a request from a client comprises receiving means for receiving a request from a client, processing means for performing a process in compliance with the request received by the receiving means, affixing means for affixing confirmation information for confirming display status of the client side to a result of process performed by the processing means, storing means for storing the confirmation information affixed by the affixing means, transmitting means for transmitting the result of process having the confirmation information affixed thereto by the affixing means to the client which has made the request, extracting means responsive to a request made again from the client, for extracting the confirmation information included in the request, determining means for determining whether or not the confirmation information extracted by the extracting means coincides with the confirmation information stored in the storing means, and withholding means a process performed by the processing means in compliance with the request if it is judged by the determining means that the two sets of confirmation information do not coincide. Accordingly, double registration of information, if tried with the Back button operated, can be prevented.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A server for performing a process in compliance with a request from a client, comprising:

receiving means for receiving a request from a client;

processing means for performing a process in compliance with the request received by said receiving means;

affixing means for affixing confirmation information for confirming display status of the client side to a result of the process performed by said processing means;

storing means for storing the confirmation information affixed by said affixing means;

liberal zone identification code affixing means for affixing a liberal zone identification code to the result of the process performed by said processing means in the case the result is a page belonging to a group of pages previously defined as a liberal zone;

transmitting means for transmitting the result of process having the confirmation information affixed thereto by said affixing means to the client which has made the request;

extracting means, responsive to a request made again by the client, for extracting the confirmation information included in the request;

determining means for determining whether or not the confirmation information extracted by said extracting means coincides with the confirmation information stored in said storing means;

withholding means for withholding said processing means from executing the request made again by the client if it is judged by said determining means that the two sets of confirmation information do not coincide; and suspending means for suspending the withholding of said withholding means when the request made again by the client contains the liberal zone identification code, thereby permitting execution of the request made again by the client.

2. The server according to claim 1, further comprising error message transmitting means for transmitting a message notifying occurrence of error to the client when the process is withheld by said withholding means.

3. The server according to claim 1, further comprising specified page information transmitting means for transmitting information about a prespecified page to the client when the process is withheld by said withholding means.

4. A computer-readable recording medium storing a program for performing a process in compliance with a request from a client, wherein the program causes a computer to function as receiving means for receiving a request from a client, processing means for performing a process in compliance with the request received by the receiving means, affixing means for affixing confirmation information for confirming display status of the client side to a result of process performed by the processing means, storing means for storing the confirmation information affixed by the affixing means, liberal zone identification code affixing means for affixing a liberal zone identification code to the result of the process performed by said processing means in the case the result is a page belonging to a group of pages previously defined as a liberal zone, transmitting means for transmitting the result of process having the confirmation information affixed thereto by the affixing means to the client which has made the request, extracting means, responsive to a request made again from the client, for extracting the confirmation information included in the request, determining means for determining whether or not the confirmation information extracted by the extracting means coincides with the confirmation information stored in the storing means, withholding means for withholding said processing means from executing the request made again by the client if it is judged by the determining means that the two sets of confirmation information do not coincide, and suspending means for suspending the withholding of said withholding means when the request made again by the client contains the liberal zone identification code, thereby permitting execution of the request made again by the client.

* * * * *